United States Patent [19]

Geyer et al.

[11] Patent Number: 4,905,665
[45] Date of Patent: Mar. 6, 1990

[54] DEVICE FOR CONVERTING SOLAR ENERGY INTO PROCESS HEAT

[75] Inventors: Michael Geyer, Sindelfingen; Christian Streuber, Wiesbaden-Auringen; Horst Kalfa, Idstein, all of Fed. Rep. of Germany

[73] Assignees: Didier-Werke ag, Wiesbaden; Deutsche Forschungs-und Versuchsanstalt fur Luft-und Raumfahrt e.V., Cologne, both of Fed. Rep. of Germany

[21] Appl. No.: 338,933

[22] Filed: Apr. 11, 1989

[30] Foreign Application Priority Data

Apr. 13, 1988 [DE] Fed. Rep. of Germany ....... 3812238

[51] Int. Cl.[4] ............................................... F24J 7/24
[52] U.S. Cl. ..................................... 126/448; 126/440
[58] Field of Search ................. 126/440, 439, 438, 448

[56] References Cited

U.S. PATENT DOCUMENTS 4,062,348  12/1977  Morrison ............................. 126/448
4,164,123  8/1979   Smith .................................. 126/438

Primary Examiner—Carroll B. Dority
Attorney, Agent, or Firm—Wenderoth, Lind & Ponack

[57] ABSTRACT

A device for converting solar energy into process heat has a number of heat exchanging pipes traversing a heat exchanger chamber. A first partial stream of gas to be heated is delivered to inlets of the pipes via an upper distribution chamber, and the first partial stream of gas is subsequently collected from outlets of the pipes in a lower distribution chamber. An inlet aperture of the heat exchanger chamber receives sunlight radiation and a second partial stream of gas to be heated, the second partial stream of gas flowing around the heat exchanger pipes. The heat exchanging pipes absorb the solar radiation and heat both the first partial stream flowing through the pipes and the second partial stream flowing around the pipes. The heated second partial stream is collected by a heated gas outlet conduit connected to the heat exchanger chamber. The lower distribution chamber is also connected to the heated gas outlet conduit, to thereby collect the heated first partial stream of gas in the heated gas outlet conduit and form a total stream of heated gas.

21 Claims, 2 Drawing Sheets

DEVICE FOR CONVERTING SOLAR ENERGY INTO PROCESS HEAT

BACKGROUND OF THE INVENTION

1. Field of the Invention

This invention relates to devices for converting solar energy into process heat in which heat exchanger elements are positioned in a heat exchanger chamber and subjected to sunlight radiation.

2. Description of the Prior Art

In known devices for converting solar energy into process heat, e.g. open, volumetric receivers, a network of ceramic fibers is positioned in a heat exchanger chamber. The ceramic fibers absorb radiated sunlight energy and emit the absorbed energy to a gas stream fed through the heat exchanger chamber and around the ceramic fibers. However, the efficiency of this type of device for converting solar energy into process heat is limited.

Pipe receivers are also known, wherein heat exchanger pipes are closely positioned in a plane. The total gas stream to be heated flows through the heat exchanger pipes, and is heated by sunlight radiation absorbed by the heat exchanger pipes. This type of heat exchanger is expensive to manufacture, because the heat exchanger pipes must be impermeable. This type of heat exchanger has the further drawback in that the heat exchanger pipes are exposed to a high temperature drop between the outside surfaces of the pipes and the inside surfaces of the pipes. The high temperature drop tends to impair the useful service life of the pipes.

SUMMARY OF THE INVENTION

In view of the above drawbacks of known devices for converting solar energy into process heat, the object of the present invention is to provide a device for converting solar energy into process heat and having a long service life with a good level of efficiency.

The above object is achieved according to the present invention by providing a heat exchanger chamber having a plurality of pipes spaced at intervals and traversing the heat exchanger chamber, the pipes acting as heat exchanger elements. A partial stream of a gas to be heated is fed through the pipes, while another partial stream of the gas to be heated is fed through the heat exchanger chamber so as to flow around the pipes. The pipes will absorb sunlight radiation, and heat the partial stream of gas flowing through the pipes as well heat the partial stream of gas flowing around the pipes. This arrangement provides a first advantage in that the pipes are externally cooled by a partial stream of gas flowing through the heat exchanger chamber, and provides a second advantage of using the interior surface of the pipes to transfer heat to another partial stream of the gas to be heated. The present invention differs from known volumetric receivers in that the gas not only flows around the heat exchanger elements, but also flows through the heat exchanger elements. The invention differs from known pipe receivers in that the gas not only flows through the heat exchanger elements, but also flows around the heat exchanger elements. Thus the present invention represents an optimal solution in terms of process and thermal technology.

The partial stream of gas to be heated by flowing through the pipes is fed to the pipes by way of a common distribution chamber, enabling uniform flow proportions through the pipes. Similarly, the heated partial stream of gas leaving the pipes is conducted into a common, second distribution chamber. Thus the pipes acting as heat exchanger elements are connected at their inlets to the first distribution chamber and at their outlets to the second distribution chamber.

The heated partial stream of gas flowing around the pipes flows to a common heated gas drain outlet. The heated partial stream of gas flowing through the pipes also flows into the common heated gas drain outlet after having flowed through the second distribution chamber, thus forming a stream of total exhaust gas in the common heated gas drain outlet.

The second distribution chamber is preferably connected to the heated gas drain outlet by a first control unit. The second distribution chamber, receiving the heated partial stream of gas flowing through the pipes, may also be connected to the input side of the heat exchanger chamber by a second control unit. Gas that has then already flowed through the heat exchanger pipes can, at least in part, be fed back through the heat exchanger chamber itself to flow around the pipes. Thus, the proportion of the heated partial stream of gas flowing through the pipes into the second distribution chamber and then either into the heat exchanger chamber or the heated gas drain outlet can be precisely controlled.

The first and second control units can be adjusted according to the temperature of the total heated gas stream and/or the external and internal wall temperatures of the pipes. By thus taking these temperatures into consideration, an optimal distribution of the heated partial stream of gas flowing through the pipes between feeding into the input side of the heat exchanger chamber and feeding out into the heated gas stream outlet is achieved.

The characteristics of the present invention described in the following description and the accompanying drawings constitute in and of themselves, or in any meaningful combination, the subject of the present invention.

BRIEF DESCRIPTION OF THE DRAWINGS

Other objects, features and advantages of the present invention will be apparent from the following detailed description of the preferred embodiment of the invention, with reference to the accompanying drawings, wherein.

DETAILED DESCRIPTION OF THE PREFERRED EMBODIMENT

Figure 1:
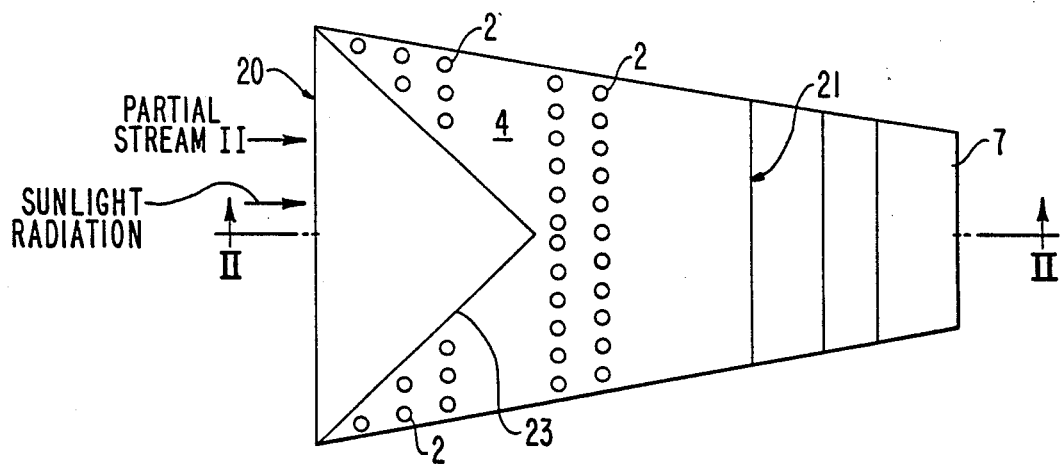
FIG. 1 is a schematic cross sectional top view of a heat exchanger device according to the present invention, taken along line I—I of FIG. 2.
Figure 2:
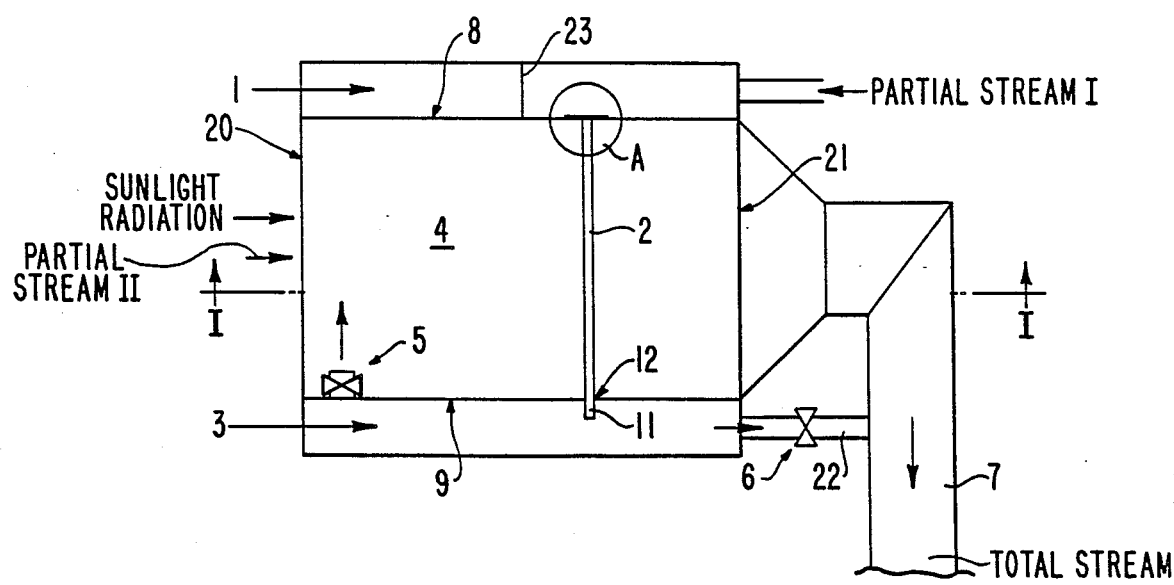
FIG. 2 is a schematic cross-sectional side view of the heat exchanger of FIG. 1 taken along line II—II therein.

The heat exchanger device according to the present invention is schematically shown in FIGS. 1-4. A heat exchanger chamber 4 has an inlet aperture 20 for receiving sunlight radiation from a reflector. The sunlight radiation entering through the aperture 20 falls on heat exchanger elements 2 extending through the heat exchanger chamber 4 transversely to the direction of the sunlight radiation entering through the aperture 20. The heat exchanger elements are pipes, preferably ceramic pipes. Gas to be heated by the heat exchanger is divided into a first partial stream I and a second partial stream II. Partial stream I is fed through the inside of the ceramic pipes 2 by a compressor (not shown) via an upper distribution chamber 1 common to all of the ceramic pipes 2, while the second partial stream II enters the heat exchanger chamber 4 through the inlet aperture 20, flows around the outsides of the ceramic pipes 2 and flows through a rear outlet aperture 21 from the heat exchanger chamber 4 into a heated gas drain outlet or conduit 7.

The ceramic pipes 2 extend from an upper, horizontal tube sheet 8 across the heat exchanger chamber 4 to a lower, horizontal tube sheet 9, bottom ends 11 of the pipes 2 protruding through apertures 12 of the tube sheet 9. Upper horizontal tube sheet 8 separates the upper distribution chamber from the heat exchanger chamber 4. Lower horizontal tube sheet 9 separates a lower distribution chamber 3, similar to the upper distribution chamber 1, from the heat exchanger chamber 4. The partial stream of gas I that is fed through the interior of the ceramic pipes 2 is thus collected in the lower distribution chamber 3 after having been heated inside the ceramic pipes. A connecting line 22 connects the second distribution chamber 3 with the heated gas drain outlet 7, so that the heated partial stream of gas I can be fed to the heated gas drain outlet 7 to join with the partial stream of gas II.

In the lower tube sheet 9, in the vicinity of the inlet aperture 20 of the heat exchanger chamber 4, is a control unit 5 for allowing a portion of the partial stream of gas I to be fed into the heat exchanger chamber 4 at the inlet aperture 20 to join with the unheated partial stream of gas II. The control unit 5 may be a butterfly or other type of control valve. A similar type of control valve is used as a control unit 6 in the connecting line 22 between the distribution chamber 3 and the heated gas drain outlet 7. By regulation of the control units 5 and 6, portions of the heated partial stream I in the second common distribution chamber 3 can either be fed back into the heat exchanger chamber 4 via the control unit 5, to flow around the ceramic pipes 2, or be fed directly to the heated gas drain outlet 7 via the connecting line 22 and the control unit 6. The control units may be adjusted depending on the desired temperature of the overall discharged gas stream and/or the external wall temperature of the ceramic pipes 2 and/or the internal wall temperature of the ceramic pipes 2. To adjust the control units 5, 6, temperature sensors in controlling relation with the control units 5, 6 may be provided in the overall discharge stream and/or on the external walls of the ceramic pipes 2 and/or on the internal walls of the ceramic pipes 2.

Figure 3:
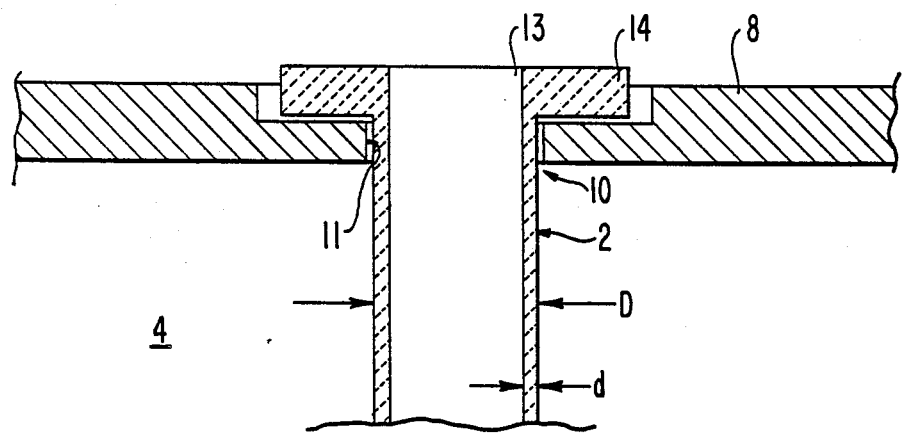
FIG. 3 is an enlargement of section A of FIG. 2.

As can be seen from FIG. 3, the ceramic pipes 2 are held in the upper, horizontal tube sheet 8 by hanging the ceramic pipes to be freely suspended through apertures 10. By allowing the ceramic pipes 2 to hang freely, the ceramic pipes 2 are easy to mount and replace. At each aperture 10, the upper, horizontal tube sheet 8 is provided with a counter sink. An upper end 13 of each ceramic pipe 2 has a radially outwardly-protruding upper collar or flange 14 engaging the counter sink, the external diameter of the support collar 14 being greater than the diameter of the respective aperture 10 in the upper tube sheet 8. Alternatively, the upper end 13 of the ceramic pipes 2 could be conically configured to provide an enlarged supporting end.

As seen from the above description of the upper and lower tube sheets 8, 9 and the suspension of the pipes 2 from the upper tube sheet 8, a physically simple and compact heat exchanger device is achieved, especially as the tube sheets 8, 9 separating the distribution chambers 1, 3 from the heat exchanger chamber 4 run parallel to each other.

Taking into consideration the ceramic wall material to be used for the ceramic pipes 2, the pipes 2 preferably have a minimum diameter D of approximately 5 mm and a minimum wall thickness d of approximately 0.5 mm in order to ensure an adequately stable construction. The density of the ceramic pipes 2 in the heat exchanger chamber is normally constant in the direction of flow. However, in order to provide the most favorable heat transfer conditions, the density of the ceramic pipes 2 may be increased or decreased in the direction of flow. Any desired increase or decrease in the density of the ceramic pipes 2 will depend in part on the volume ratio of the first partial stream of gas I flowing through the heat exchanger pipes to the second partial stream of gas II flowing around the heat exchanger pipes through the heat exchanger chamber 4.

The wall material of the heat exchanger pipes 2 is preferably a ceramic material, but could be a high temperature-resistant metal material such as nickel based alloys like Inconel 718 or Hastelloy X. Suitable non-metallic ceramic materials include SiC, SiSiC, or SSN(sintered silicon nitride). Those skilled in the art will understand that other materials, achieving the functions disclosed herein, can be employed.

A particular advantage of the present invention is that there is no need to insure that the heat exchanger pipes 2 or their connection with the tube sheets are especially impermeable. This is because both the insides and the outsides of the heat exchanger pipes 2 are exposed to flowing streams of the same gas. Thus no special sealing of the pipes 2 is required, and the heat exchanger pipes 2 could be made of a porous material, such as Pantel, for example.

The flow profile of the heat exchanger chamber 4 is normally constant in the direction of flow. However, in order to generate special flow conditions, it can also taper in the direction of flow, as shown in FIG. 1, taking into consideration the density distribution of the ceramic pipes 2 traversing the heat exchanger chamber 4. The flow profile of the heat exchanger chamber 4 may also expand in the direction of flow through the heat exchanger chamber, so that the heat exchanger chamber will be smallest at the inlet aperture 20, resulting in an optimal capture of the sunlight radiation.

As can be further seen from FIG. 1, the heat exchanger pipes 2 are arranged in several transverse rows at intervals from one another. A portion of the upper distribution chamber 1 may have a V-shaped section 23 at the inlet area of the heat exchanger chamber 4, in accordance with a desired distribution of the heat exchanging pipes 2 and the flow and heating patterns of the partial stream of gas I and II. But note that the arrangement of FIG. 1 is only exemplary. The arrangement can be adapted to any flow and heat transfer condition to insure both optimal heat transformation of the sunlight radiation into heat energy absorbed by the pipe material and favorable heat exchange conditions between the heat exchanger pipes 2 and the partial streams of gas I and II.

Figure 4:
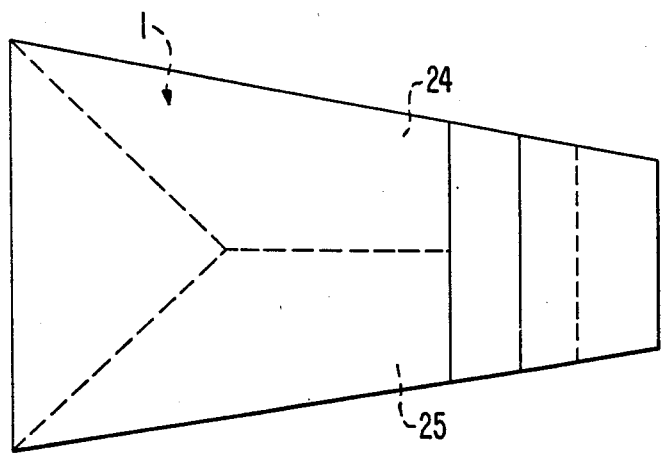
FIG. 4 is a schematic top view of a heat exchanger device according to a modification of the present invention.

As illustrated in FIG. 4, in a modification of the above-described embodiment of the invention, the upper distribution chamber 1 may be divided into two (or more) subchambers 24, 25 not directly connected with each other. Each subchamber may thus receive a specified portion of the total volume of the first partial stream of gas I, the specified portion having a predetermined partition ratio. Admitting different volumes of the partial stream of gas I to the subchambers enables further control of the heating pattern of the first partial stream of gas I through determination of the amount of the first partial stream of gas I to flow into a subchamber and its respective heat exchanging pipes. Similarly to the upper distribution chamber 1, the lower distribution chamber 3 may be divided into two or more subchambers not directly connected with each other. The partition ratio of the subchambers of the lower distribution chamber 3 may correspond to the partition ratio of the subchambers of the upper distribution chamber 1, or the partition ratio of the subchambers of the lower distribution chamber 3 may be chosen to be different from that of the subchambers of the upper distribution chamber 1. The subchambers of the upper and lower distribution chambers 1, 3 are then connected by the heat exchanging pipes 2 so that the temperature distribution in the portions of the partial stream of gas I can be adjusted by the heat exchanging pipes 2.

In the above described embodiment of the invention, the process heat generated may be converted directly in the heat exchanger chamber or receiver. For example, a chemical reaction can occur directly in the receiver.

Although the present invention has been described and illustrated with respect to preferred features thereof, it is to be understood that various modifications and changes may be made to the specifically described and illustrated features without departing from the scope of the present invention.

We claim:

1. An apparatus for converting solar energy into process heat comprising:
    means for defining a heat exchanger chamber for receiving sunlight radiation therein;
    heat exchanging means in said heat exchanger chamber for absorbing said sunlight radiation and heating therewith a first partial stream of gas flowing through said heat exchanging means and a second partial stream of gas flowing around said heat exchanging means, said heat exchanging means comprising a plurality of spaced heat exchanging pipes traversing said heat exchanger chamber and through which said first partial stream of gas to be heated is fed and around which said second partial stream of gas to be heated is fed.

2. The apparatus for converting solar energy into process heat as set forth in claim 1, wherein:
    said plurality of heat exchanging pipes each includes an inlet end for receiving said first partial stream of gas in an unheated state and an outlet end for outputting said first partial stream of gas in a heated state; and
    means for defining a first distribution chamber is provided for distributing said unheated first partial stream of gas to said inlet ends of said plurality of heat exchanging pipes.

3. The apparatus for converting solar energy into process heat as set forth in claim 2, wherein:
    means for defining a second distribution chamber is provided for receiving said heated first partial stream of gas from said outlet ends of said plurality of heat exchanging pipes.

4. The apparatus for converting solar energy into process heat as set forth in claim 3, wherein:
    said first distribution chamber is separated from said heat exchanger chamber by a first tube sheet; and
    said second distribution chamber is separated from said heat exchanger chamber by a second tube sheet.

5. The apparatus for converting solar energy into process heat as set forth in claim 4, wherein:
    said first and second tube sheets are substantially horizontally disposed and vertically spaced from each other, with said heat exchanger chamber therebetween, each said tube sheet having a plurality of apertures therein; and
    each said heat exchanging pipe is freely suspended from one of said apertures in said first tube sheet and extends through one of said apertures of said second tube sheet into said second distribution chamber.

6. The apparatus for converting solar energy into process heat as set forth in claim 5, wherein:
    each said heat exchanging pipe has a support collar for supporting said pipe at a respective said aperture in said first tube sheet.

7. The apparatus for converting solar energy into process heat as set forth in claim 5, wherein:
    each said heat exchanging pipe has a conically configured upper end for supporting said pipe at a respective said aperture in said first tube sheet.

8. The apparatus for converting solar energy into process heat as set forth in claim 3, wherein:
    said means for defining said first distribution chamber comprises means for defining at least two first distribution chamber subchambers; and
    said means for defining said second distribution chamber comprises means for defining at least two second distribution chamber subchambers.

9. The apparatus for converting solar energy into process heat as set forth in claim 2, wherein:
    said means for defining said first distribution chamber comprises means for defining at least two first distribution chamber subchambers.

10. The apparatus for converting solar energy into process heat as set forth in claim 1, and further comprising:
    a heated gas drain outlet connected to said means for defining said heat exchanger chamber for receiving said second partial stream of gas from said heat exchanger chamber after said second partial stream of gas has been heated by said heat exchanging means.

11. The apparatus for converting solar energy into process heat as set forth in claim 10, and further comprising:
    means for defining a distribution chamber for receiving said heated first partial stream of gas from said plurality of spaced heat exchanging pipes; and
    connecting means for connecting said means for defining said distribution chamber to said heated gas drain outlet enabling said heated first partial stream of gas to flow from said distribution chamber to said heated gas drain outlet, whereby said first and second partial streams of gas are joined in said heated gas drain outlet to form a total heated stream of gas.

12. The apparatus for converting solar energy into process heat as set forth in claim 11, wherein:

said connecting means has a first control means for controlling the flow of said heated first partial stream of gas from said distribution chamber to said heated gas drain outlet.

13. The apparatus for converting solar energy into process heat as set forth in claim 12, further comprising:

second control means, connecting said distribution chamber to said heat exchanger chamber, for controlling a flow of said heated first partial stream of gas from said distribution chamber into said heat exchanger chamber, wherein said first and second control means can be adjusted relative to each other to control the temperature of the total heated stream of gas.

14. The apparatus for converting solar energy into process heat as set forth in claim 1, wherein:

each said heat exchanging pipe has a minimum outside diameter of 5 mm and a minimum wall thickness of approximately 0.5 mm.

15. The apparatus for converting solar energy into process heat as set forth in claim 1, wherein:

the walls of said plurality of heat exchanging pipes are made of a high-temperature resistant metal material.

16. The apparatus for converting solar energy into process heat as set forth in claim 15, wherein:

said high-temperature resistant metal material comprises a nickel based alloy.

17. The apparatus for converting solar energy into process heat as set forth in claim 1, wherein:

the walls of said plurality of heat exchanging pipes are made of ceramic material.

18. The apparatus for converting solar energy into process heat as set forth in claim 17, wherein:

said ceramic material comprises SiC, SiSiC, or sintered silicon nitride.

19. The apparatus for converting solar energy into process heat as set forth in claim 1, wherein:

said plurality of heat exchanging pipes are made of a porous material.

20. The apparatus for converting solar energy into process heat as set forth in claim 1, and further comprising:

means for combining said first partial stream of gas with said second partial stream of gas after both said streams of gas have been heated.

21. The apparatus for converting solar energy into process heat as set forth in claim 20, wherein:

said means for combining said first and second partial streams of gas comprises a gas conduit.

* * * * *

UNITED STATES PATENT AND TRADEMARK OFFICE
CERTIFICATE OF CORRECTION

PATENT NO. : 4,905,665

DATED : March 6, 1990

INVENTOR(S) : Michael GEYER, Christian STREUBER and Horst KALFA

It is certified that error appears in the above-identified patent and that said Letters Patent is hereby corrected as shown below:

In column 2, line 55, delete "and";

line 58, replace "." with -- ; and --;

between lines 58 and 59, insert -- Figure 5 shows an alternative arrangement of a top end of a heat exchanger pipe. --.

Column 4, line 2, replace "." with -- as shown in Fig. 5. --.

Signed and Sealed this

Thirteenth Day of August, 1991

Attest:

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,905,665

DATED : March 6, 1990

INVENTOR(S) : Michael GEYER, Christian STREUBER and Horst KALFA

It is certified that error appears in the above-identified patent and that said Letters Patent is hereby corrected as shown below:

IN THE DRAWINGS:

Please add the following new drawing figure

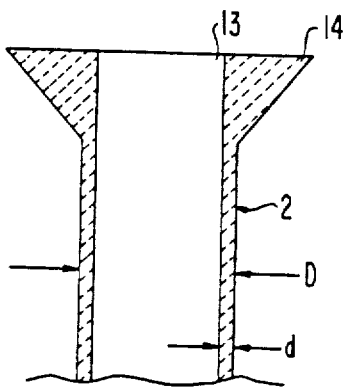

FIG. 5